(12) United States Patent
Lee et al.

(10) Patent No.: US 11,253,993 B2
(45) Date of Patent: Feb. 22, 2022

(54) METHOD FOR MODELING ROBOT SIMPLIFIED FOR STABLE WALKING CONTROL OF BIPEDAL ROBOT

(71) Applicant: KOREA INSTITUTE OF SCIENCE AND TECHNOLOGY, Seoul (KR)

(72) Inventors: Jongwoo Lee, Seoul (KR); Yonghwan Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 334 days.

(21) Appl. No.: 16/463,117

(22) PCT Filed: Mar. 29, 2017

(86) PCT No.: PCT/KR2017/003413
§ 371 (c)(1),
(2) Date: Jun. 27, 2019

(87) PCT Pub. No.: WO2018/097419
PCT Pub. Date: May 31, 2018

(65) Prior Publication Data
US 2020/0016740 A1    Jan. 16, 2020

(30) Foreign Application Priority Data
Nov. 22, 2016    (KR) ......................... 10-2016-0155493

(51) Int. Cl.
*B25J 9/16*    (2006.01)
*B25J 9/00*    (2006.01)
(Continued)

(52) U.S. Cl.
CPC ........... *B25J 9/0006* (2013.01); *B25J 9/1607* (2013.01); *B25J 13/085* (2013.01); *B25J 9/1641* (2013.01);
(Continued)

(58) Field of Classification Search
CPC ...... B25J 9/0006; B25J 9/1607; B25J 9/1641; B25J 13/085; B62D 57/032; G05D 2201/0217
(Continued)

(56) References Cited

U.S. PATENT DOCUMENTS

2006/0076167 A1 *    4/2006    Setrakian ............... B62D 57/00
                                                          180/8.1
2007/0227786 A1 *    10/2007    Hillis .................. B62D 57/022
                                                          180/8.1
(Continued)

FOREIGN PATENT DOCUMENTS

JP    2006-116672 A    5/2006
JP       4707372 B2    6/2011
(Continued)

OTHER PUBLICATIONS

Jongwoo Lee et al., "A Planar Stable Walking Model based on Ankle Actuation and the Virtual Pendulum Concept", 2016 IEEE/RSJ International Conference on Intelligent Robots and Systems (IROS), Oct. 9-14, 2016, pp. 5169-5174.
(Continued)

*Primary Examiner* — Dalena Tran
(74) *Attorney, Agent, or Firm* — Rabin & Berdo, P.C.

(57) ABSTRACT

A method for modeling a robot simplified for stable walking control of a bipedal robot provides a robot model that is simplified as a virtual pendulum model including a virtual body, two virtual legs connected to the body at a virtual pivot point (VPP) that is set at a position higher than the center of mass (CoM) of the body, and virtual feet connected to the two legs, respectively, to step on the ground. A ground reaction force, which acts on the two legs, acts towards the
(Continued)

(a)

(b)

VPP, thereby providing a restoring moment with respect to the CoM such that stabilization of the posture of the body naturally occurs.

9 Claims, 6 Drawing Sheets

(51) Int. Cl.
   *B25J 13/08* (2006.01)
   *B62D 57/032* (2006.01)

(52) U.S. Cl.
   CPC ... *B62D 57/032* (2013.01); *G05D 2201/0217* (2013.01)

(58) Field of Classification Search
   USPC ........ 700/245, 261; 318/568.12, 565; 901/1, 901/46
   See application file for complete search history.

(56) References Cited

U.S. PATENT DOCUMENTS

| | | |
|---|---|---|
| 2009/0271037 A1 | 10/2009 | Hong et al. |
| 2011/0040410 A1 | 2/2011 | Kim et al. |
| 2012/0165987 A1 | 6/2012 | Kim et al. |
| 2015/0134080 A1* | 5/2015 | Roh ........................ B25J 9/0006 623/32 |
| 2015/0202768 A1* | 7/2015 | Moridaira ............ B62D 57/032 700/258 |

FOREIGN PATENT DOCUMENTS

| | | |
|---|---|---|
| JP | 5605624 B2 | 10/2014 |
| KR | 10-2009-0113958 A | 11/2009 |
| KR | 10-2011-0017500 A | 2/2011 |
| KR | 10-2012-0071599 A | 7/2012 |

OTHER PUBLICATIONS

Daniel Renjewski et al., "Exciting Engineered Passive Dynamics in a Bipedal Robot", IEEE Transactions On Robotics, Oct. 2015, pp. 1244-1251, vol. 31, No. 5.

Jooeun Ahn et al., "A Simple State-Determined Model Reproduces Entrainment and Phase-Locking of Human Walking", Plos One, Nov. 2012, pp. 1-11, vol. 7, Issue 11.

Reinhard Blickhan et al., "Positioning the hip with respect to the COM: Consequences for leg operation", Journal of Theoretical Biology, 2015, pp. 187-197, vol. 382, date is not available.

* cited by examiner

METHOD FOR MODELING ROBOT SIMPLIFIED FOR STABLE WALKING CONTROL OF BIPEDAL ROBOT

TECHNICAL FIELD

The present disclosure relates to a method for modeling a bipedal robot, and more particularly, to a method for modeling a simplified robot for providing control logic for stable walking and balance control of a bipedal robot.

BACKGROUND ART

Many studies have been made on bipedal robots that mimic humans. Bipedal robots have many advantages, but they are difficult to control the balance while walking.

For walking and balance control of bipedal robots, a variety of simplified virtual models (templates) are designed. The simplified models are used to provide simplified control logics for walking control, by simplifying bipedal robots having high-order nonlinear characteristics.

The widely used robot model is typically a linear inverted pendulum model (LIPM). The linear inverted pendulum model simplifies and models a robot as a point mass that has the center of mass and can pivot around the zero moment point (ZMP). The linear inverted pendulum model has an advantage of allowing the high-order dynamic interpretation. However, bipedal robots designed based on the linear inverted pendulum model make a little bit more unnatural motions than real motions of humans.

To overcome the drawback of the linear inverted pendulum model, there is a proposed method for modeling a robot as a spring loaded inverted pendulum (SLIP) model whereby a bipedal robot is modeled as a body of a point mass supported on spring legs. However, because the robot model modeled as SLIP is interpreted on the premise that energy is conserved, the implemented bipedal robot loses its balance and falls over when an unexpected external force is applied, no matter how small the force is. Additionally, the simplified robot model using the point mass cannot appropriately describe the balance stabilization of the upper body that is a critical issue in biped walking.

DISCLOSURE

Technical Problem

The present disclosure is directed to providing a simplified robot model of a bipedal robot that easily stabilizes the posture of the body by the introduction of a virtual pendulum model, and at the same time, has a stable limit-cycle walking trajectory in consideration of a loss of energy generated from the leg stepping on the ground while walking and active energy generated by the driving power provided by the ankle.

Technical Solution

According to an aspect of the present disclosure, there is provided a method for modeling a robot simplified for stable walking control of a bipedal robot, including: providing a robot model that is simplified as a virtual pendulum model including a virtual body, two virtual legs connected to the body at a virtual pivot point (VPP) that is set at a position higher than the center of mass (CoM) of the body, and virtual feet connected to the two legs, respectively, to step on the ground, wherein a ground reaction force, which acts on the two legs, acts towards the VPP, thereby providing a restoring moment with respect to the CoM such that stabilization of the posture of the body naturally occurs.

According to an embodiment, there is provided the method for modeling a robot, in which the robot model is provided with driving power necessary for walking by a torque ("ankle torque") generated by a motion of an ankle of a leg ("trailing leg") positioned at a rear side in a double stance phase in which the two legs contact the ground while walking, and provides the ankle torque to compensate for kinetic energy of the robot model lost by an impact when a leg ("leading leg") positioned at a front side in the double stance phase steps on the ground.

According to an embodiment, the posture and motion of the robot model are defined from a first angle between the leading leg and an imaginary line extending perpendicularly to the ground from the VPP, and a second angle between a segment of a line connecting the VPP and the CoM and the imaginary line.

According to an embodiment, a kinematic equation of the robot model is defined by the ground reaction force acting towards the VPP at a heel of the leading leg and a tiptoe of the trailing leg.

According to an embodiment, the body is set to freely rotate around the virtual pivot point.

According to an embodiment, the body is set as a rigid body having a predetermined mass and inertia moment, and the legs and the feet are set as a massless rigid body of a straight line shape.

According to an embodiment, the VPP and the ankle of the leading leg act as a frictionless hinge in the double stance phase.

According to an embodiment, in the double stance phase, the ankle of the trailing leg acts as a torsional spring, and the ankle torque is determined by an angle of the ankle of the trailing leg.

According to an embodiment, at the transition from a single stance phase in which one of the two legs contacts the ground to the double stance phase, an angle between the two legs with respect to the VPP keeps constant while walking.

BEST MODE

Hereinafter, the preferred embodiments of the present disclosure will be described with reference to the accompanying drawings. Although the present disclosure is described with reference to the embodiments shown in the drawings, this is described as an embodiment, and the technical spirit of the present disclosure and its key elements and operation are not limited thereto.

Figure 1:
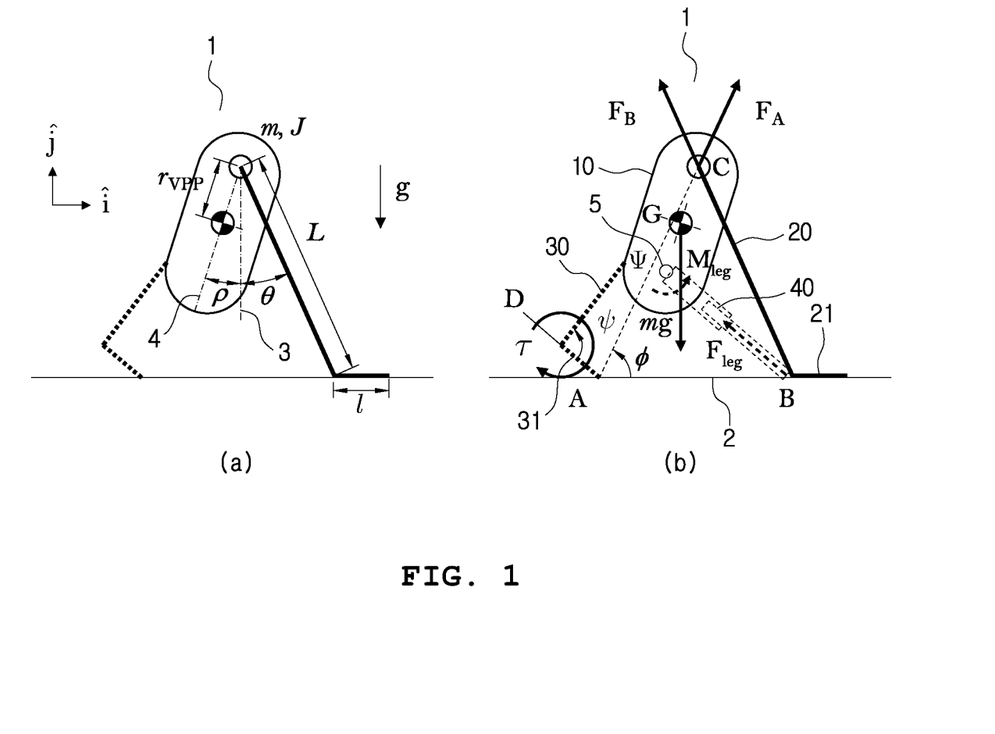
FIG. 1 is a conceptual diagram of a virtual robot model according to an embodiment of the present disclosure.

FIG. 1 is a conceptual diagram of a virtual robot model 1 according to an embodiment of the present disclosure.

The robot model 1 is a simplified virtual model provided to implement a control algorithm for stable walking control of a bipedal robot, and according to this embodiment, it is simplified as a virtual pendulum model.

As shown in FIGS. 1(A) and 1(B), the robot model 1 is modeled as a virtual body 10, two virtual legs 20, 30 connected to the body 10, and virtual feet 21, 31 connected to the two legs 20, 30, respectively, to step on the ground 2.

The body 10 is set as a rigid body having a predetermined length, and has a predetermined mass m and inertia moment J. The mass m and the inertia moment J of the body 10 correspond to the total mass and the total inertia moment of the bipedal robot actually implemented based on the robot model 1.

The legs 20, 30 are formed in the shape of a straight line having a predetermined length L, with no joint. In this instance, the legs 20, 30 are set as a massless rigid body. The feet 21, 31 connected respectively to the legs 20, 30 are also formed in the shape of a straight line having a predetermined length l, and they are treated as a massless rigid body.

In the double stance phase in which the two legs 20, 30 contact the ground while walking, the leg 30 positioned at the rear side is referred to as a "trailing leg", and the leg 20 positioned at the front side is referred to as a "leading leg". It should be understood that the legs indicated by the trailing leg and the leading leg are alternated each step in walking.

The two virtual legs 20, 30 are connected to the body 10 at a virtual pivot point (VPP) C. The pivot point C is formed at a position higher than the center of mass (CoM) G of the body 10. The pivot point C is spaced apart a predetermined distance $r_{VPP}$ from the center of mass G along a lengthwise axis 4 of the body 10, and the body 10 is treated as a sort of pendulum that can freely rotate around the pivot point C.

Assume that a torque $M_{leg}$ at the hip 5 serving as a support point of the real leg 40 of the real bipedal robot based on the robot model 1 and a force $F_{leg}$ along the axis of the real leg 40 can be expressed by reaction forces $F_A$, $F_B$ transmitted from the ground 2 along the virtual legs.

The generalized coordinates for describing the posture and motion of the robot model 1 are defined by a first angle θ between an imaginary line 3 extending vertically downward from the pivot point C and the leading leg 20, and a second angle ρ between the imaginary line 3 and a segment of a line (the lengthwise axis of the body) 4 connecting the pivot point C and the center of mass G. Both the first angle θ and the second angle ρ have a positive value in the counterclockwise direction.

Figure 2:
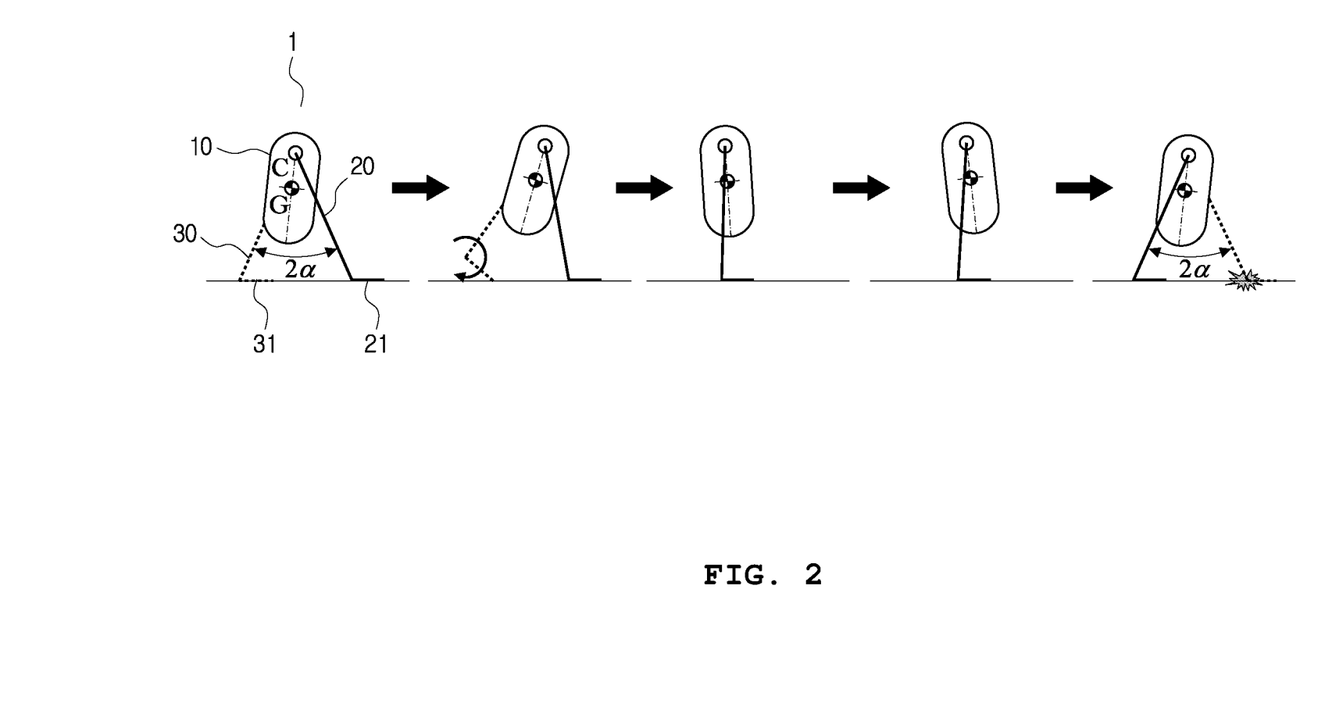
FIG. 2 is a motion diagram showing the motion of a robot model during one walking step.

FIG. 2 is a motion diagram showing the motion of the robot model 1 during one walking step.

A single step starts with collision of the foot 21 of the leading leg 20 with the ground 2. Subsequently, there is a double stance phase in which the two legs 20, 30 are on the ground until the trailing leg 30 lifts off the ground, and in the double stance phase, the pivot point C and the ankle B of the leading leg 30 are set to act as a frictionless hinge.

In the robot model 1 according to this embodiment, the driving power necessary for walking of the robot model 1 is provided by a torque ("ankle torque") generated by the motion of the ankle D of the trailing leg 30. In this instance, the ankle D of the trailing leg 30 acts as a linear torsional spring with the ankle torque τ being defined as τ=κ(μ−ψ). Here, k is the torsional stiffness of the torsional spring, μ is an angle at which the ankle D of the trailing leg 30 can be extended to the maximum extent, and ψ is an angle of the ankle D of the trailing leg 30.

According to this embodiment, it should be understood that, in the robot model 1, the ankle of the trailing leg is not a passive element, and provides an active work. Many studies have revealed that in human walking, the driving power of the ankle does an active work to provide a propulsive torque while walking.

After the initial collision between the foot 21 of the leading leg 20 and the ground, a propulsive force is obtained by the extension of the ankle D of the trailing leg 30, and in this instance, when μ=ψ the ankle torque is 0, and the phase changes a single stance phase in which the trailing leg 30 lifts off the ground and only the existing leading leg 20 is on the ground.

During the continued single stance phase, the motion of the leg and the body is determined by passive dynamics. Assume that the motion of the trailing leg 30 that lifts off the ground and swings forward can be arbitrarily controlled without any effort. Additionally, assume that at the transition from the single stance phase to the double stance phase for the next step, collision occurs, provoking an impact inelastically applied between the swing leg touching the ground and the ground 2. At this moment, the existing leading leg 20 and the trailing leg 30 exchange their roles. At the moment of the transition to the double stance phase (touchdown), an angle between the two legs 20, 30 is controlled to 2α.

FIG. 1(B) is a free body diagram of the robot model 1 in the double stance phase. According to this embodiment, for simplified interpretation of dynamics, assume that the ground reaction force is concentrated as the force $F_A$ acting on the tiptoe A of the trailing leg 30 and the force $F_B$ acting on the heel B of the leading leg 20. That is, the double stance phase starts with the motion of stepping on the ground on tiptoe A with the heel D of the trailing leg 30 raised, and in this instance, the ankle B of the leading leg 20 does not provide any driving power to the robot model 1. Assume that the two legs 20, 30 and feet 21, 31 are massless, and accordingly, the ground reaction forces $F_A$, $F_B$ directly act towards the pivot point C.

The robot model is designed in which the ground reaction forces $F_A$, $F_B$ directly act towards the pivot point C, so that robot walking can reflect real human walking dynamics in which the ground reaction forces intersect at a position higher than the CoM, not the CoM position, while walking. As the ground reaction forces acting towards the pivot point C provide a restoring moment with respect to the CoM located at a lower position, the pendulum (body) rotates toward the lower position at which the forces are balanced with respect to the pivot point C, and thus the posture stabilization of the body is naturally accomplished. Accordingly, it is possible to contribute to the stabilization of the body 10 without any other means for control such as collection of information associated with global orientation.

In the robot model 1, the motion of the pivot point C is written as the following [Equation 1].

[Equation 1]

$$\begin{cases} r_{BC} = L(-\sin\theta \hat{i} + \cos\theta \hat{j}), \\ v_{BC} = L(-\dot{\theta}\cos\theta \hat{i} - L\dot{\theta}\sin\theta \hat{j}), \\ a_{BC} = L\{(-\ddot{\theta}\cos\theta + \dot{\theta}^2\sin\theta)\hat{i} + (-\ddot{\theta}\sin\theta - \dot{\theta}^2\cos\theta)\hat{j}\} \end{cases}$$

Additionally, a relative motion of the center of mass G of the body 10 to the pivot point C is written as the following [Equation 2].

$$\begin{cases} r_{CG} = r_{VPP}(\sin\rho \hat{i} - \cos\rho \hat{j}), \\ v_{CG} = r_{VPP}(\dot{\rho}\cos\rho \hat{i} + \dot{\rho}\sin\rho \hat{j}), \\ a_{CG} = r_{VPP}\{(\ddot{\rho}\cos\rho - \dot{\rho}^2\sin\rho)\hat{i} + (\ddot{\rho}\sin\rho + \dot{\rho}^2\cos\rho)\hat{j}\} \end{cases}$$ [Equation 2]

In the robot model 1 according to this embodiment, there are three forces acting on the body 10: the gravity mg, the reaction force $F_A$ transmitted from the trailing leg, and the reaction force $F_B$ transmitted from the leading leg. A relationship between these forces according to the law of linear and angular inertia is defined as the following [Equation 3].

$$\begin{cases} F_A + F_B + mg = ma_{BG}, \\ r_{GC} \times F_A + r_{GC} \times F_B = J\ddot{p} \end{cases}$$ [Equation 3]

Here, $F_A = F_B(\cos\phi \hat{i} + \sin\phi \hat{j})$, $F_B = F_B(-\sin 0 \hat{i} + \cos 0 \hat{j})$, and $\phi$ is an angle between a segment of a line connecting the pivot point C and the tiptoe A of the trailing leg 30 and the ground 2. The angle $\phi$ has a positive value in the counterclockwise direction. Additionally, $a_{BG}$ is acceleration of the center of mass G relative to the heel B of the leading leg 20, and has a relation of $a_{BG} = a_{BC} + a_{CG}$.

Combining the above [Equation 1] to [Equation 3], the kinematic equation of the robot model 1 is obtained in the form of the following [Equation 5].

$$D\ddot{q} + C\dot{q} + G = \Gamma$$ [Equation 5]

where $$D = \begin{bmatrix} mL^2 & -mr_{VPP}L\cos(\theta - \rho) \\ -mr_{VPP}L\cos(\theta - \rho) & J + mr_{VPP}^2 \end{bmatrix},$$

$$C = mr_{VPP}L\sin(\theta - \rho) \begin{bmatrix} -\dot{\rho} & \dot{\theta} - \dot{\rho} \\ \dot{\theta} - \dot{\rho} & \dot{\theta} \end{bmatrix},$$

$$G = \begin{bmatrix} -mgL\sin\theta \\ mgr_{VPP}\sin\rho \end{bmatrix}, \text{ and}$$

$$\Gamma = \begin{bmatrix} -LF_A\cos(\phi - \theta) \\ 0 \end{bmatrix}$$

In the above [Equation 5], the generalized coordinates for describing the posture and motion of the robot model 1 are defined as $q = [\theta, \rho]^T$.

According to this embodiment, as the legs and the feet are set as a massless rigid body, the reaction force $F_A$ acting on the trailing leg 30 is defined as [Equation 7] as a function of torque $\tau$ generated by the motion of the ankle (i.e., extension of the ankle) of the trailing leg 30 defined as the following [Equation 6].

$$\tau = \kappa(\mu - \psi), \quad \frac{\pi}{2} - \alpha \leq \psi \leq \mu$$ [Equation 6]

$$F_A = \frac{\sqrt{L^2 + l^2 - 2Ll\cos\psi}}{Ll\sin\psi}\tau$$ [Equation 7]

The shape of the related leg may be expressed in a simplified form as shown in the following [Equation 8].

$$\begin{cases} \phi = \arctan\left(\frac{L\cos\theta}{(2L\sin\alpha - l) - L\sin\theta}\right), \\ \psi = \arccos\left(\frac{L^2 + l^2 - \Psi^2}{2Ll}\right), \\ \Psi^2 = \{(2L\sin\alpha - l) - L\sin\theta\}^2 + (L\cos\theta)^2 \end{cases}$$ [Equation 8]

The above description is about dynamics of the robot model 1 in the double stance phase, and at the transition to the single stance phase followed by lift-off of the trailing leg 30, the robot model 1 acts as a pendulum suspended on the end of the massless leg 20 that pivots around the heel B of the leading leg 20. The kinematic equation of the robot model 1 at this moment is written as the above [Equation 5] $F_A = 0$. As the legs and the feet are set massless, dynamics during the lift-off and swing of the trailing leg 30 is not considered herein.

Figure 3:
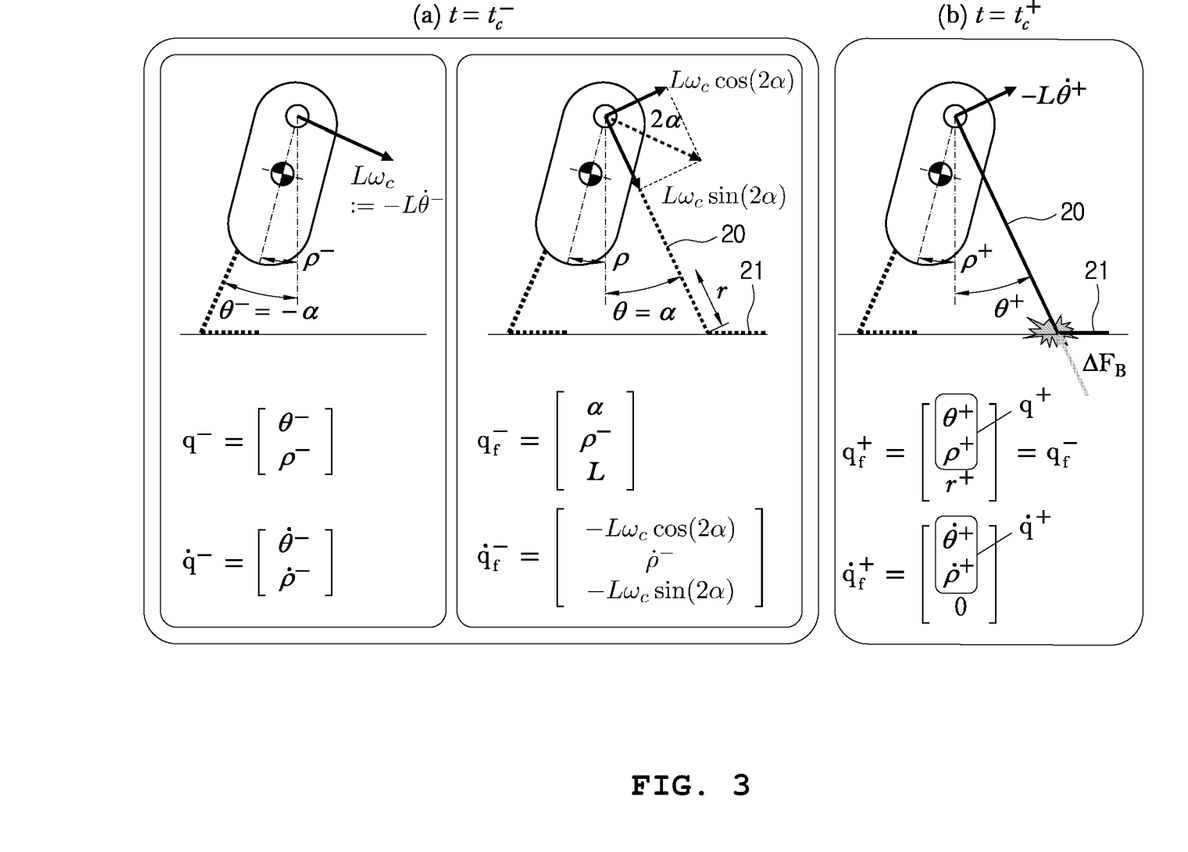
FIG. 3 is a diagram illustrating the states immediately before and after collision of a leading leg of a robot model with the ground.

FIG. 3 is a diagram illustrating the states immediately before and after the collision of the leading leg 20 with the ground.

Describing the condition for the transition from the single stance phase to the double stance phase, as described above, when the leading leg 20 contacts the ground through the previous forward walking, the double walking state starts. In this instance, an angle between the two legs 20, 30 is set to $2\alpha$, and the heel D of the trailing leg 30 is set to rise instantly. Additionally, when the leading leg 20 contacts the ground, an impact is instantaneously provoked, and collision is perfectly inelastic. Upon collision of the leg 20 as a rigid body with the ground 2, an impact force is applied to the robot model 1 and kinetic energy of the robot model 1 is lost, accompanied by a discontinuous change in the velocity of the robot model 1. The states of the robot model 1 immediately after the collision with the ground (right after the touchdown) may be described by $q^+ = [\theta^+, \rho^+]^T$ and $\dot{q}^+ = [\dot{\theta}^+, \dot{\rho}^+]^T$, and the above two states may be appropriately calculated by the states $q^- = [\theta^-, \rho^-]^T$ and $\dot{q}^- = [\dot{\theta}^-, \dot{\rho}^-]^T$ immediately before the collision between the leading leg 20 and the ground (right before the touchdown).

To resolve the amount of impact and the states after collision at the same time, first, an inertia matrix of a floating body is built. Subsequently, impact dynamics obtained by the law of moment is resolved using kinematics at high speed.

The body 10, which is a rigid body, may be interpreted as a floating body by introducing a new variable r that indicates the radial displacement of the pivot point C from the heel B of the leading leg 20, such as $r_{BC} = r(-\sin\theta \hat{i} + \cos\theta \hat{j})$.

The generalized coordinates of the body 10, which is a floating body, are defined as the following [Equation 9].

$$q_f = [q^T, r]^T = [\theta, \rho, r]^T$$ [Equation 9]

Subsequently, algebraic impact maps for $\dot{q}_f^+$ and the amount of impact $\Delta F_B := \int F_B dt$ are simultaneously calculated as shown in the following [Equation 10].

$$\begin{bmatrix} D_f & -J^T \\ J & 0 \end{bmatrix} \begin{bmatrix} \dot{q}_f^+ \\ \Delta F_B \end{bmatrix} = \begin{bmatrix} D_f \dot{q}_f^- \\ 0 \end{bmatrix}$$ [Equation 10]

where $$D_f = \begin{bmatrix} mr^2 & D_f(1,2) & 0 \\ D_f(2,1) & J + mr_{VPP}^2 & D_f(2,3) \\ 0 & D_f(3,2) & m \end{bmatrix},$$

-continued $$D_f(1, 2) = D_f(2, 1) := -mr_{VPP}r\cos(\theta - \rho),$$

$$D_f(2, 3) = D_f(3, 2) := -mr_{VPP}\sin(\theta - \rho),$$

$$J = [0, 0, 1]$$

In this instance, as the position of the robot model 1 is constantly maintained during instantaneous collision, the inertia matrix $D_f$ of the floating body is calculated from $(q_f^- = q_f^+ = q_f)$.

The states of the robot model 1 immediately before the collision are written as the following [Equation 11] and [Equation 12] as shown in FIG. 3(A).

$$q_f^- = q_f^+ = q_f = \begin{bmatrix} \alpha \\ \rho^- \\ L \end{bmatrix} \quad \text{[Equation 11]}$$

$$\dot{q}_f^- = \begin{bmatrix} -L\omega_c\cos(2\alpha) \\ \dot{\rho}^- \\ -L\omega_c\sin(2\alpha) \end{bmatrix} \quad \text{[Equation 12]}$$

Here, $L\omega_c := -L\dot{\theta}^-$ denotes the linear velocity of the pivot point C at the moment of collision.

As can be seen from [Equation 10], under the condition that the legs are a rigid body, the kinematic constraint $J\dot{q}_f^+ = \dot{r}^+ = 0$ occurs.

The states after collision for taking the next step may be updated by $q_f^+$ obtained in the above [Equation 9] and $\dot{q}_f^+$ obtained in the above [Equation 10].

When the angle of the ankle D of the trailing leg 30 reaches the peak extension angle μ, the double stance phase ends and the single stance phase starts. At this moment, the vertical component of the ground reaction force will be 0.

Describing the above context again, the angle α and the angle ρ immediately before the foot 21 of the leading leg 20 contacts the ground 2 are a control value for stable walking of the robot model 1, and should always have a constant value. Accordingly, setting to $q^- = q^+$ is performed to maintain the same posture of the robot before and after collision with the ground.

Furthermore, immediately after the collision, when an amount of impact $\Delta F_B$ applied to the heel B of the leading leg 20 is calculated and then applied to [Equation 10], $\dot{q}_f^+$ of may be obtained.

As shown in FIG. 3(B), the angular velocity of the first angle θ and the angular velocity of the second angle ρ may be calculated through $\dot{q}_f^+$.

When the first angle θ and the second angle ρ immediately after the collision and their angular velocities are applied to the kinematic equation of the robot model 1, [Equation 5], $F_A$ may be calculated, and the ankle torque τ that may induce the reaction force $F_A$ may be calculated through [Equation 7].

At the moment of collision, when the angle ψ that generates the ankle torque τ is controlled by the motion of the ankle D of the trailing leg 30, energy lost by the impact with the ground generated at the moment when the leading leg steps on the ground in the robot model 1 may be compensated through the ankle torque τ.

The modeling method of the robot model 1 as described above provides a control algorithm for controlling the stable walking of the real bipedal robot. As shown in FIG. 1(B), when the foot of the real leg 40 of the bipedal robot is designed to move with the same footstep as the virtual foot, an amount of impact applied to the foot when the leading leg of the real leg 40 steps on the ground is calculated, and the linear velocity of the pivot point C of the bipedal robot at the moment of collision is calculated through a sensor, a control value that controls the walking of the bipedal robot according to the robot model 1 may be obtained.

When a combination of torques of motors provided in the real bipedal robot is controlled to be equal to the ankle torque actually calculated at the position of the ankle D of the virtual trailing leg 30, the real bipedal robot can walk according to the walking algorithm of the simplified robot model 1 described in this embodiment.

According to this embodiment, a loss of kinetic energy of the robot model 1 lost due to the impact of the leading leg with the ground while walking is compensated by the driving power of the ankle of the trailing leg, and thus the posture may be gradually stabilized while walking. Particularly, the body 10 may have the stabilized posture without particular efforts by the introduction of the concept of a virtual pendulum model.

Simulation for verification is performed. As an initial condition, the robot model 1 is set to take the initial step with excessive kinetic energy compared to stable state, and the robot model 1 is allowed to take 100 steps. In this instance, the parameter condition of the robot model is m=80 kg, J=4.6 kg·m², L=1.2 m, I=0.2 m, $r_{VPP}$=0.1 m, g=9.81 m/s², α=20°, μ=120°, k=120 N·m/rad. These parameters are set similar to the real sizes of human.

Figure 4:
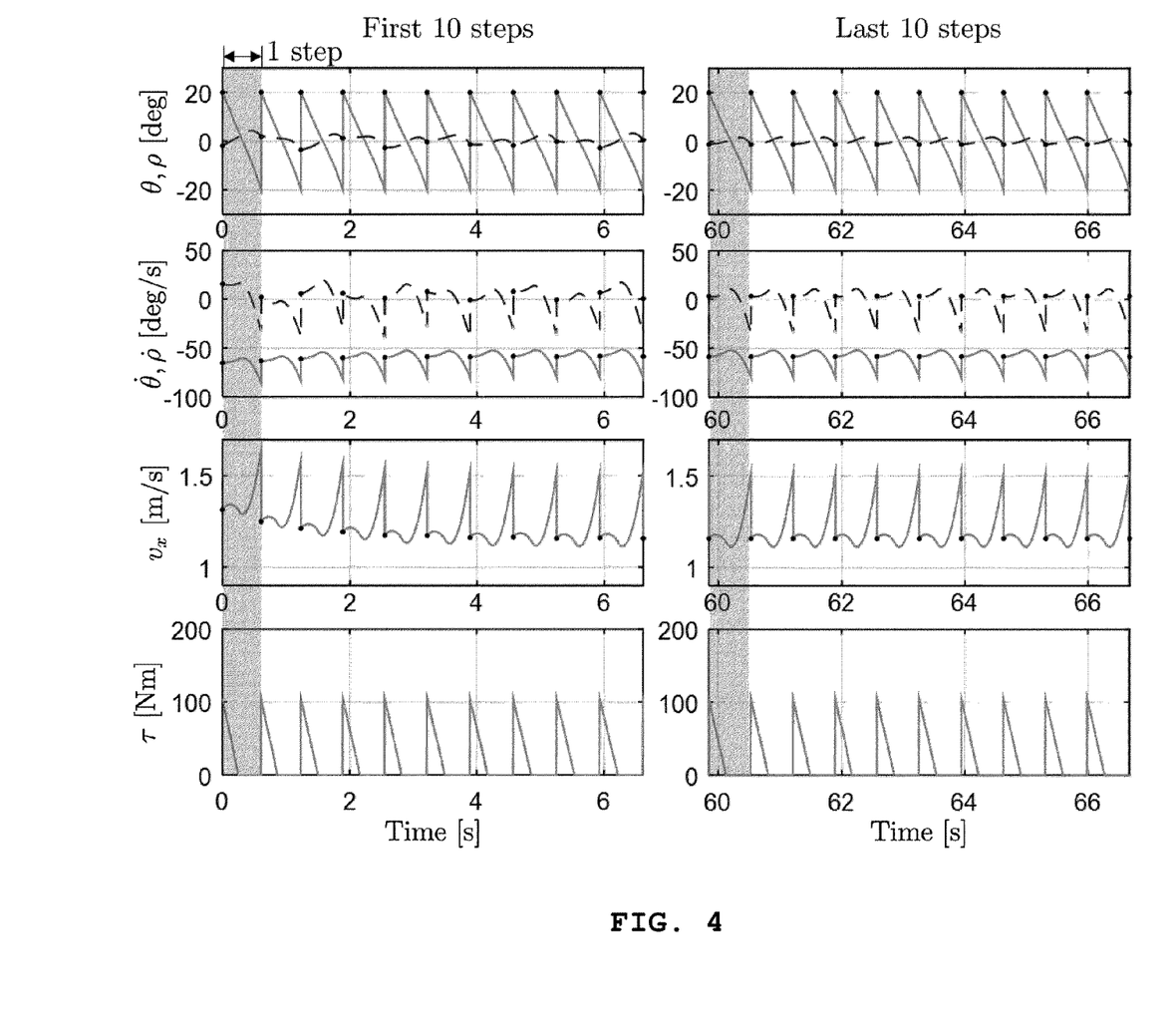
FIGS. 4 to 6 are graphs showing the results of walking simulation using the robot model of FIG. 1.

FIG. 4 is a graph of the results appearing when taking first 10 steps and last 10 steps in the simulation. In this instance, the feature appearing for the last 10 step shows a stable walking state in which excessive energy initially applied to the robot model 1 is cancelled.

Referring to FIG. 4, it can be seen that the robot model walks through a periodic trajectory, and find out a stable walking state (a state appearing in the last 10 steps) quickly within the first 10 steps. In the stable walking state, oscillation ρ of the body is maintained at a value that is smaller than 5°.

Figure 5:
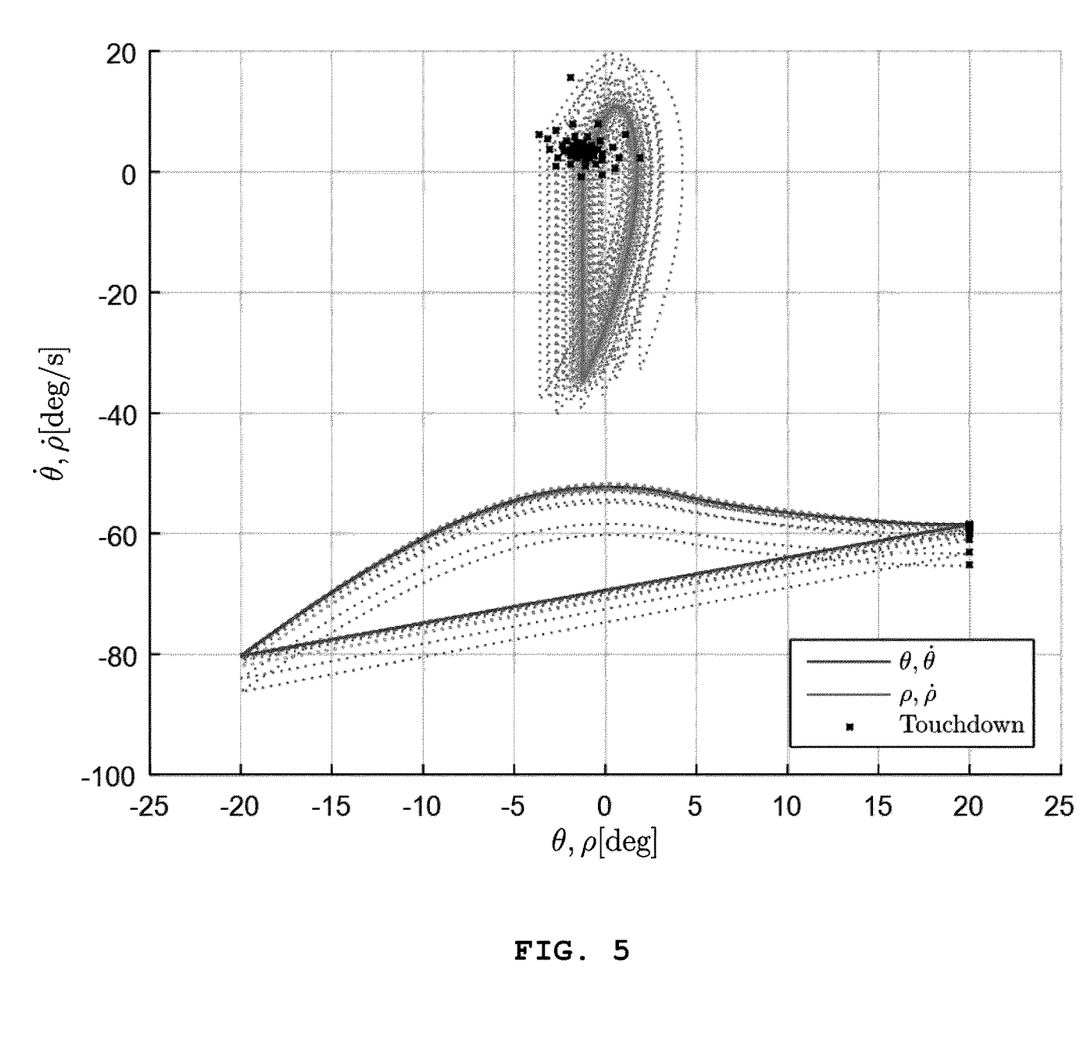

FIG. 5 is a result of simulation of the phase portrait while the robot model 1 is walking.

In FIG. 5, the dotted line represents the trajectory during the whole simulation. It can be seen that the trajectory converges to a periodic trajectory indicated by the solid line (line appearing in the last 10 steps). As disturbances are removed from the region of attraction over time, the periodic trajectory leads to conclude that the limit-cycle in the system of the robot model 1 is stable. In FIG. 5, the black square point indicates the state in each collision with the ground. As the black point converges to a single point, the limit-cycle has 1-periodicity, and the single point may be referred to as a fixed point. As consecutive steps show the same feature, this limit-cycle describes the balanced walking feature.

Figure 6:
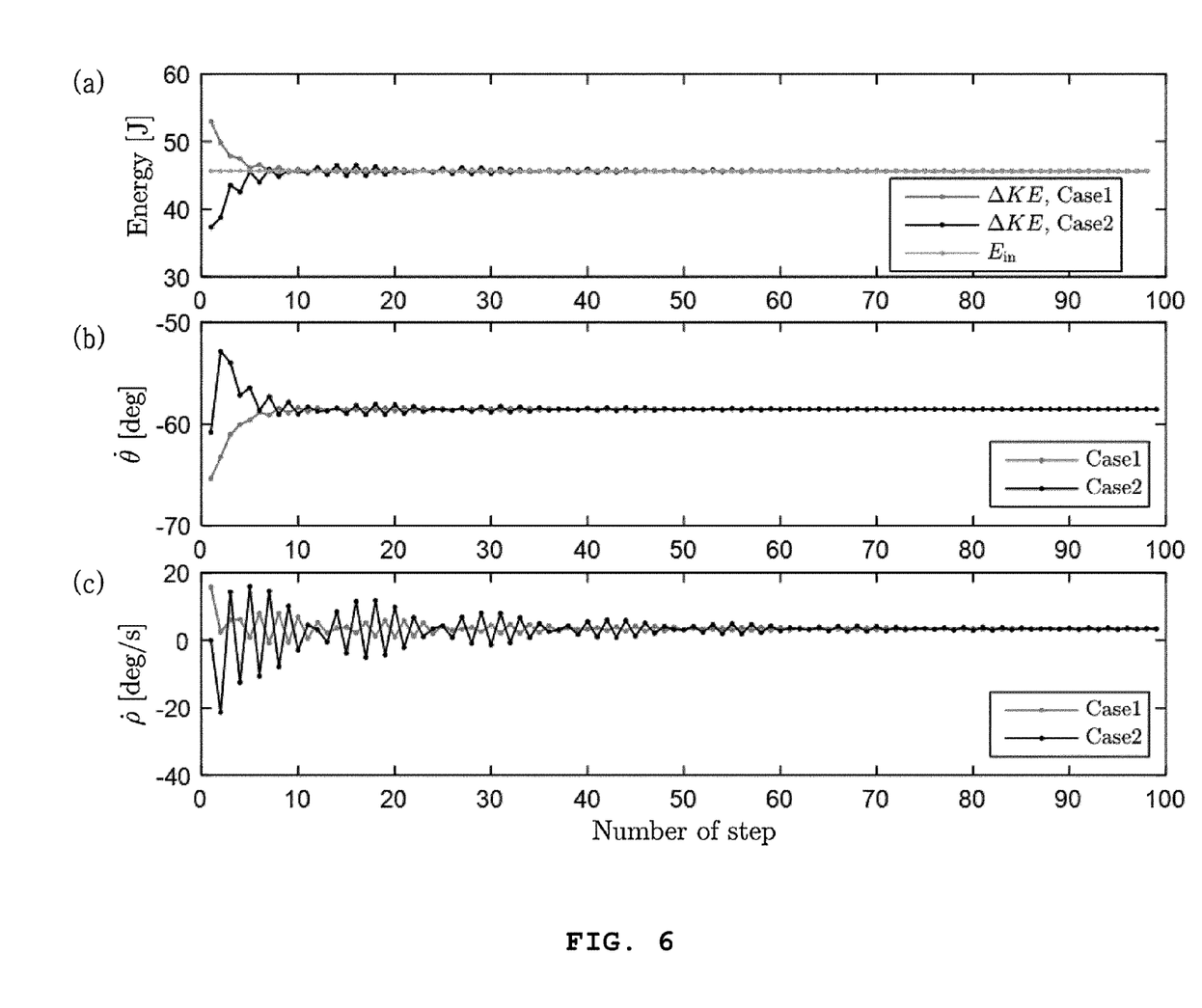

FIG. 6 is a graph showing energy loss and replenishment occurring in the robot model 1 according to this embodiment.

FIG. 6(A) shows a comparison between an energy loss by the impact with the ground $\Delta KE = |KE^+ - KE^-|$, where $KE^+$ is kinetic energy after impact, and $KE^-$ is kinetic energy before impact, and work $E_{in}$ done by the ankle torque each step in the robot model 1. The work $E_{in}$ is constant in each step, and is calculated as shown in the following [Equation 13].

$$E_{in} = \int_{\phi_0}^{\phi_f} \tau(\theta)d\phi - \frac{1}{2}\kappa\left[\mu - \left(\frac{\pi}{2} - \alpha\right)\right]^2 \quad \text{[Equation 13]}$$

In FIG. 6, Case 1 shows the case in which the robot model 1 starts steps with excessive kinetic energy at the beginning as previously described, and Case 2 shows the case in which the robot model 1 starts steps with insufficient kinetic energy at the beginning.

Referring to FIG. 6, as expected, it can be seen that the states of the robot model 1 converge to a point at which an energy loss by the impact is accurately compensated by energy injected by the driving power by the ankle torque. To be more exact, in Case 1, a larger amount of energy than energy obtained for first several steps is lost, and the energy level of the robot model 1 is adjusted to the energy level for stable periodic walking. In contrast, in Case 2, it can be seen that an energy loss by the impact is smaller than energy injected until the robot model 1 walks stably. Accordingly, it turns out that the robot model 1 converges to a gradually stable walking state.

Even though the bipedal robot controlled by the robot model 1 has excessive kinetic energy compared to the stable walking state by an external force applied while walking, the impact force applied by the ground and the driving power provided by the ankle of the trailing leg are balanced quickly, thereby keeping walking while maintaining the stable posture.

The robot model 1 according to this embodiment can provide the walking control model of the simplified robot for walking control of the bipedal robot, by introducing the concept of an energy loss by the impact and driving power provided by the ankle into the virtual pendulum model.

The body 10 of the robot model 1 is supported by the pivot point C by the virtual massless legs, contributing to the stabilization of the body 10 without any information associated with global orientation. Additionally, gradually stable limit-cycle walking is achieved by the interaction between the nonlinear mechanical system and the ground, and thus there is no need for trajectory planning in the single/double stance phase or no effort to correct perturbation caused by external disturbances.

Accordingly, the robot model 1 according to this embodiment can provide an effective template for controlling the real bipedal robot.

What is claimed is:

1. A method for modeling a robot simplified for stable walking control of a bipedal robot, comprising:
   providing a robot model that is simplified as a virtual pendulum model, the robot model including
   a virtual body,
   two virtual legs connected to the body at a virtual pivot point (VPP) that is set at a position higher than a center of mass (CoM) of the body; and
   virtual feet connected to the two legs, respectively, to step on a surface
   wherein a ground reaction force, which acts on the two legs, acts towards the VPP, thereby providing a restoring moment with respect to the CoM such that stabilization of a posture of the body naturally occurs.

2. The method for modeling a robot according to claim 1, wherein the robot model is provided with driving power necessary for walking by an ankle torque generated by a motion of an ankle of a trailing leg of the two legs positioned at a rear side in a double stance phase in which the two legs contact the surface while walking, and provides the ankle torque to compensate for kinetic energy of the robot model lost by an impact when a leading leg of the two legs positioned at a front side in the double stance phase steps on the surface.

3. The method for modeling a robot according to claim 2, wherein the posture and a motion of the body are defined from a first angle between the leading leg and an imaginary line extending perpendicularly to the surface from the VPP, and a second angle between a segment of a line connecting the VPP and the CoM and the imaginary line.

4. The method for modeling a robot according to claim 2, wherein a kinematic equation of the robot model is defined by the ground reaction force acting towards the VPP at a heel of the leading leg and a tiptoe of the trailing leg.

5. The method for modeling a robot according to claim 2, wherein the VPP and an ankle of the leading leg act as a frictionless hinge in the double stance phase.

6. The method for modeling a robot according to claim 2, wherein in the double stance phase, the ankle of the trailing leg acts as a torsional spring, and the ankle torque is determined by an angle of the ankle of the trailing leg.

7. The method for modeling a robot according to claim 2, wherein at a transition from a single stance phase in which one of the two legs contacts the surface to the double stance phase, an angle between the two legs with respect to the VPP keeps constant while walking.

8. The method for modeling a robot according to claim 1, wherein the body is set to freely rotate around the virtual pivot point.

9. The method for modeling a robot according to claim 1, wherein the body is set as a rigid body having a predetermined mass and inertia moment, and
   the legs and the feet are set as a massless rigid body of a straight line shape.

* * * * *